United States Patent
Probst et al.

(10) Patent No.: US 9,798,058 B2
(45) Date of Patent: Oct. 24, 2017

(54) WIRE GRID POLARIZER WITH SIDE REGION

(71) Applicant: Moxtek, Inc., Orem, UT (US)

(72) Inventors: Dean Probst, West Jordan, UT (US); Qihong Wu, Campsie (AU); Eric Gardner, Eagle Mountain, UT (US); Mark Alan Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 15/458,557

(22) Filed: Mar. 14, 2017

(65) Prior Publication Data

US 2017/0184768 A1 Jun. 29, 2017

Related U.S. Application Data

(63) Continuation of application No. 14/470,351, filed on Aug. 27, 2014, now Pat. No. 9,632,223.

(60) Provisional application No. 61/924,569, filed on Jan. 7, 2014, provisional application No. 61/924,560, filed on Jan. 7, 2014, provisional application No. 61/895,225, filed on Oct. 24, 2013.

(51) Int. Cl.
  *G02B 5/30* (2006.01)
  *G02B 1/12* (2006.01)

(52) U.S. Cl.
  CPC .......... *G02B 5/3058* (2013.01); *G02B 1/12* (2013.01)

(58) Field of Classification Search
  CPC .................. G02B 5/3058; G02B 1/12
  USPC .................. 359/405.05, 487.03, 485.05, 900
  See application file for complete search history.

(56) References Cited

U.S. PATENT DOCUMENTS

| | | |
|---|---|---|
| 5,991,075 A | 11/1999 | Katsuragawn et al. |
| 6,212,014 B1 | 4/2001 | Lehman, Jr. et al. |
| 6,288,840 B1 | 9/2001 | Perkins et al. |
| 6,665,119 B1 | 12/2003 | Kurtz et al. |
| 7,085,050 B2 | 8/2006 | Florence |
| 7,158,302 B2 * | 1/2007 | Chiu .................... G02B 5/3058 359/485.03 |
| 7,233,563 B2 | 6/2007 | Ueki et al. |
| 7,692,860 B2 | 4/2010 | Sato et al. |
| 7,961,393 B2 | 6/2011 | Perkins et al. |
| 8,467,128 B2 | 6/2013 | Huang |
| 8,506,827 B2 | 8/2013 | Wu et al. |
| 8,611,007 B2 | 12/2013 | Davis |
| 8,709,703 B2 | 4/2014 | Deng et al. |
| 8,755,113 B2 | 6/2014 | Gardner et al. |
| 8,804,241 B2 | 8/2014 | Wu et al. |
| 8,808,972 B2 | 8/2014 | Wang et al. |
| 8,913,321 B2 | 12/2014 | Davis |
| 9,348,076 B2 | 5/2016 | Wang et al. |

(Continued)

OTHER PUBLICATIONS

Stenkamp et al.; "Grid polarizer for the visible spectral region." SPIE, pp. 288-296. vol. 2213.

*Primary Examiner* — Ricky D Shafer
(74) *Attorney, Agent, or Firm* — Thorpe, North & Western, LLP

(57) ABSTRACT

Structures and methods of making wire grid polarizers having multiple regions, including side bars, strips, and/or side ribs along sides of a central region. The central region can include a single region or multiple regions. Each region can have a different function for improving polarizer performance. The various regions can support each other for improved wire grid polarizer durability.

20 Claims, 10 Drawing Sheets

(56) References Cited

U.S. PATENT DOCUMENTS

| | | |
|---|---|---|
| 9,354,374 B2 | 5/2016 | Wang et al. |
| 9,632,223 B2 | 4/2017 | Probst et al. |
| 9,632,224 B2 | 4/2017 | Nielson et al. |
| 2005/0045799 A1* | 3/2005 | Deng .................. G02B 5/3083 250/200 |
| 2007/0297052 A1 | 12/2007 | Wang et al. |
| 2008/0018997 A1* | 1/2008 | Kawazu ............... G02B 5/3058 359/487.03 |
| 2008/0137188 A1* | 6/2008 | Sato .................... G02B 5/3058 359/485.05 |
| 2009/0041971 A1 | 2/2009 | Wang et al. |
| 2011/0080640 A1* | 4/2011 | Kaida .................. G02B 5/3058 359/485.05 |
| 2011/0310329 A1* | 12/2011 | Kumai ................. G02B 27/283 349/62 |
| 2012/0075699 A1 | 3/2012 | Davis et al. |
| 2012/0105745 A1* | 5/2012 | Kumai ................. G02B 5/3058 349/5 |
| 2014/0300964 A1 | 10/2014 | Davis et al. |
| 2015/0077851 A1 | 3/2015 | Wang et al. |
| 2015/0346497 A1 | 12/2015 | Huang et al. |
| 2016/0231487 A1 | 8/2016 | Wangensteen et al. |
| 2016/0291227 A1 | 10/2016 | Nielson et al. |
| 2016/0357064 A1 | 12/2016 | Nielson et al. |
| 2017/0059758 A1 | 3/2017 | Wang et al. |
| 2017/0068103 A1 | 3/2017 | Huang et al. |

\* cited by examiner

WIRE GRID POLARIZER WITH SIDE REGION

CLAIM OF PRIORITY

This is a continuation of U.S. patent application Ser. No. 14/470,351, filed Aug. 27, 2014; which claims priority to U.S. Provisional Patent Application Nos. 61/924,569, filed on Jan. 7, 2014; 61/924,560, filed on Jan. 7, 2014; and 61/895,225, filed on Oct. 24, 2013; which are hereby incorporated herein by reference in their entirety.

FIELD OF THE INVENTION

The present application is related generally to wire grid polarizers.

BACKGROUND

Wire grid polarizers may be used for polarizing light, by allowing one polarization of light to pass through the polarizer, and reflecting or absorbing an opposite polarization of light. For simplicity, the polarization that primarily passes through the polarizer will be referred to as p-polarized light and the polarization that primarily is reflected or absorbed will be referred to as s-polarized light. Goals of wire grid polarizer design include increasing transmission of p-polarized light, decreasing transmission of s-polarized light, and increasing reflection or absorption of s-polarized light. Different applications have different requirements.

The goals of increasing transmission of p-polarized light and decreasing transmission of s-polarized light are common to most or all applications. There can be a trade-off between these two. In other words, certain designs that may increase transmission of p-polarized light may also undesirably increase transmission of s-polarized light. Other designs that decrease transmission of s-polarized light may also undesirably decrease transmission of p-polarized light.

For some applications, it is desirable to reflect as much s-polarized light as possible. For example, if s-polarized light is primarily reflected, then the optical system can effectively utilize both the transmitted p-polarized light and the reflected s-polarized light. It can be important in such designs to increase reflection of s-polarized light without reducing transmission of p-polarized light. Sometimes there is a trade-off in a particular design between increasing transmission of p-polarized light and increasing reflection of s-polarized light.

For other applications, absorption of s-polarized light may be preferred. Absorption of s-polarized light may be preferred if the reflection of light can disrupt the image or other intended use. For example, in a transmissive panel image projection system, reflected light may go back into the LCD imager causing image degradation, or stray light can reach the screen, degrading contrast. An ideal selectively absorptive wire grid polarizer will transmit all p-polarized light and selectively absorb all s-polarized light. In reality, some s-polarized light is transmitted and some reflected and some p-polarized light is absorbed and some reflected. Sometimes there is a trade-off in a particular design between increasing transmission of p-polarized light and increasing absorption of s-polarized light.

The effectiveness of a wire grid polarizer can thus be quantified by (1) high transmission of p-polarized light; (2) high absorption or reflection of s-polarized light, depending on the design; and (3) high contrast. Contrast is equal to percent of p-polarized light transmitted (Tp) divided by percent of s-polarized light transmitted (Ts): Contrast=Tp/Ts.

It can be important in wire grid polarizers for infrared, visible, and ultraviolet light to have small wires with small pitch, such as nanometer or micrometer size and pitch, for effective polarization. Typically, a pitch of less than half of the wavelength of light to be polarized is needed for effective polarization. Smaller pitches may improve the contrast. Thus, small pitch can be an important feature of wire grid polarizers. Manufacture of wire grid polarizers with sufficiently small pitch is challenging, and is a goal of research in this field.

Small wires can be damaged by handling and by environmental conditions. Protection of the wires can be important in wire grid polarizers. Durability of wire grid polarizers is thus another important feature.

For example, see U.S. Pat. No. 5,991,075, U.S. Pat. No. 6,288,840, U.S. Pat. No. 6,665,119, U.S. Pat. No. 7,630,133, U.S. Pat. No. 7,692,860, U.S. Pat. No. 7,800,823, U.S. Pat. No. 7,961,393, and U.S. Pat. No. 8,426,121; U.S. Patent Publication Numbers US 2008/0055723, US 2009/0041971, and US 2009/0053655; U.S. patent application Ser. No. 13/326,566, filed on Dec. 15, 2011; "Application of 100 Å linewidth structures fabricated by shadowing techniques" by D. C. Flanders in J. Vac. Sci. Technol., 19 (4), November/December 1981; and "Submicron periodicity gratings as artificial anisotropic dielectrics" by Dale C. Flanders in Appl. Phys. Lett. 42 (6), 15 Mar. 1983, pp. 492-494.

SUMMARY

It has been recognized that it would be advantageous to provide a durable wire grid polarizer with high transmission of p-polarized light, high contrast, and small, pitch. High absorption or high reflection of s-polarized light, depending on the design, can also be important. The present invention is directed to various embodiments of wire grid polarizers having multiple regions, which can include a central region and side region(s), and methods of making wire grid polarizers, which satisfy these needs. Each of the various embodiments may satisfy one or more of these needs.

In one embodiment, the wire grid polarizer can comprise a substrate that is substantially transmissive to incoming light with an array of parallel, elongated first lower ribs disposed over the substrate. The first lower ribs can have a bottom attached to the substrate, a top surface opposite the bottom, and two opposite sides. An array of parallel, elongated, first upper ribs can be disposed over the top surface of the first lower ribs such that each first lower rib is paired with a corresponding first upper rib to define an array of center ribs or a central region. The wire grid polarizer can also comprise an array of elongated side bars including a side bar disposed along each side of each of the center ribs. A side region can include the side bars. There can be a gap between a side bar and corresponding center rib and an adjacent side bar and corresponding center rib. At least one of the first lower ribs, first upper ribs, and side bars can be reflective of incoming light A first method of making a wire grid polarizer can comprise:
1. providing a substrate:
   a. that is substantially transmissive to incoming light; and
   b. having a continuous thin film of material over a surface of the substrate;

2. etching the substrate and the thin film to form:
   a. an array of parallel, elongated center ribs disposed over the substrate, the center ribs comprising lower first lower ribs and first upper ribs; and
   b. solid-material-free gaps between the ribs;
3. conformal coating the substrate and the center ribs with a layer of material while maintaining solid-material-free gaps between the ribs; and
4. etching the layer of material to remove horizontal segments and leaving vertical side bars along sides of the center ribs.

A second method of making a wire grid polarizer can comprise
1. providing a substrate, that is substantially transmissive to incoming light, and an array of parallel, elongated first lower ribs disposed over the substrate;
2. conformal coating the substrate and the first lower ribs with a layer of material while maintaining solid-material-free first gaps between the first lower ribs;
3. etching the layer of material to remove horizontal segments and leaving vertical side bars along sides of the first lower ribs;
4. backfilling the first gaps and continuing to fill above the first lower ribs and the side bars with fill material, the fill material having similar etch properties with the first lower ribs;
5. etching the fill material and the first lower ribs below a top of the side bars forming solid-material-free second gaps between tops of the side bars and forming second lower ribs between the side bars on a same plane as the first lower ribs; and
6. backfilling the second gaps and continuing to fill above the side bars with upper material.

Figure 1:
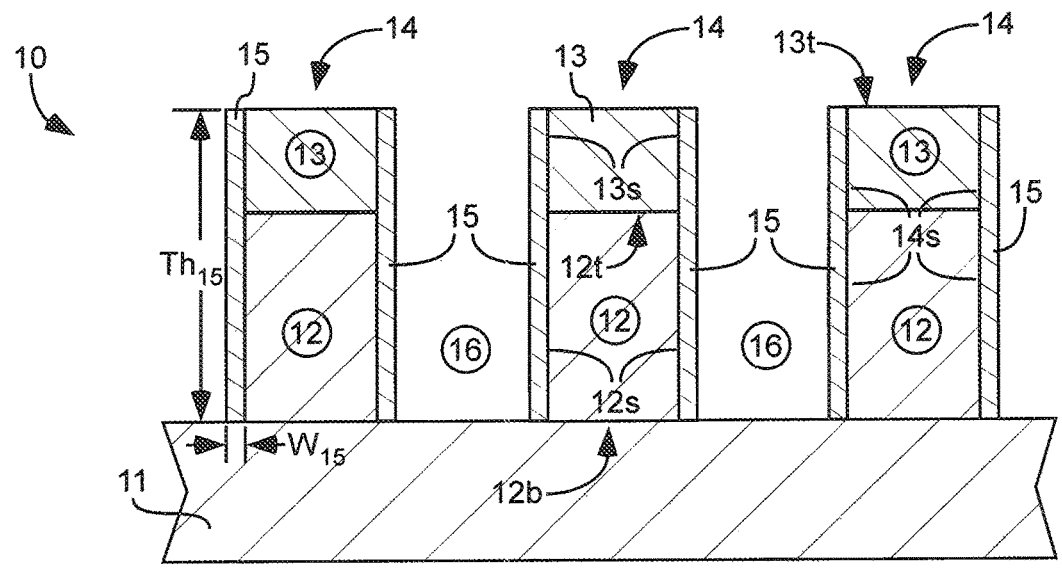
FIG. 1 is a schematic cross-sectional side view of a wire grid polarizer 10 including (1) center ribs 14 comprising first lower ribs 12 and first upper ribs 13 and (2) side bars 15 disposed along each side of each of the center ribs 14, in accordance with an embodiment of the present invention.

REFERENCE NUMBERS IN THE DRAWINGS 10 wire grid polarizer
11 substrate
12 first lower rib
12b bottom of the first lower rib 12
12t top surface of the first lower rib 12
12s side of the first lower rib 12
13 first upper rib
13t top of the first upper rib 13
14 center rib
14s side 14s of the center rib 14
15 side bar
15br bottom region of the side bar 15
15t top the side bar 15
15tr top region of the side bar 15
16 gap between each side bar 15 and corresponding center rib 14 and an adjacent side bar 15 and corresponding center rib 15
20 wire grid polarizer
24 side rib
30 wire grid polarizer
32 dielectric material
40 wire grid polarizer
42 second lower rib
43 second upper rib
53 thin film
71 horizontal segment
75 layer of material
96 first gap
122 fill material
136 second gap
143 upper material
160 wire grid polarizer
161 strip
161t top of the strip 161
163 lower wire
165 upper wire
166 gaps between the strips 161
170 wire grid polarizer
180 wire grid polarizer
190 wire grid polarizer
194 central group
d depth of etch below a top 15t of the side bars 15
H height
$Th_{13}$ upper rib 13 and 43 thickness
$Th_{15}$ side bar 15 thickness
$Th_{161}$ strip 161 thickness
$W_{15}$ side bar 15 width
$W_{75}$ layer of material 75 width
$W_{161}$ strip 161 width

DEFINITION

Many materials used in optical structures absorb some amount of light, reflect some amount of light, and transmit some amount of light. The following definitions are intended to distinguish between materials or structures that are primarily absorptive, primarily reflective, or primarily transmissive.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transmissive structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transmissive structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).
   d. Metals are often used as reflective materials.
   e. Reflective wires can be used for separating one polarization of light from an opposite polarization of light.
3. As used herein, the term "transmissive" means substantially transmissive to light in the wavelength of interest.
   a. Whether a material is "transmissive" is relative to other materials used in the polarizer. Thus, a transmissive structure will transmit substantially more than an absorptive or a reflective structure.
   b. Whether a material is "transmissive" is dependent on the wavelength of interest. A material can be transmissive in one wavelength range but not in another.

c. In one aspect, a transmissive structure can transmit greater than 90% and absorb less than 10% of light in the wavelength of interest.
4. As used in these definitions, the term "material" refers to the overall material of a particular structure. Thus, a structure that is "absorptive" is made of a material that as a whole is substantially absorptive, even though the material may include some reflective or transmissive components. Thus for example, a rib made of a sufficient amount of absorptive material so that it substantially absorbs light is an absorptive rib even though the rib may include some reflective or transmissive material embedded therein.
5. As used herein, the term "light" can mean light or electromagnetic radiation in the x-ray, ultraviolet, visible, and/or infrared, or other regions of the electromagnetic spectrum.
6. As used herein, the term "substrate" includes a base material, such as for example a glass wafer. The term "substrate" includes a single material, and also includes multiple materials, such as for example a glass wafer with at least one thin film on a surface of the wafer used together as the base material.

DETAILED DESCRIPTION

First Structure Group (FIGS. 1-4):

As illustrated in FIG. 1, a wire grid polarizer 10 is shown comprising an array of parallel, elongated first lower ribs 12 disposed over a substrate 11. The first lower ribs 12 can have a bottom 12$b$ attached to the substrate 12, a top surface 12$t$ opposite the bottom 12$b$, and two opposite sides 12$s$. The first lower ribs 12 can be integral with, and can be formed of the same material as, the substrate 11. Alternatively, the first lower ribs 12 can be formed of a different material than the substrate 11. The substrate 11 can be substantially transmissive to incoming light.

The first lower ribs 12 can be substantially absorptive of incoming light, substantially reflective of incoming light, or substantially transmissive to incoming light or of a desired wavelength range of light. The first lower ribs 12 can comprise or can consist of a dielectric material, a metal, or other material. Whether the first lower ribs 12 are substantially absorptive, substantially transmissive, or substantially reflective can depend on overall polarizer structure and intended use.

An array of parallel, elongated, first upper ribs 13 can be disposed over the top surface 12$t$ of the first lower ribs 12. The first upper ribs 13 can have sides 13$s$ that are substantially parallel with sides 12$s$ of the first lower ribs 12. The first lower ribs 12 and/or the first upper ribs 13 can be called or can be part of a central region. Each first lower rib 12 can be paired with a corresponding first upper rib 13 to define an array of center ribs 14.

The first upper ribs 13 can comprise or can consist of a dielectric material, a metal, or other material. The first upper ribs 13 can be substantially absorptive, substantially reflective, or substantially transmissive of incoming light or of a desired wavelength range of light. Whether the first upper ribs 13 are substantially absorptive, substantially transmissive, or substantially reflective can depend on overall polarizer structure and intended use.

The wire grid polarizer 10 can further comprise an array of elongated side bars 15, including a side bar 15 disposed along each side 14$s$ of each of the center ribs 14. Thus, a pair of side bars 15 can sandwich and can adjoin a center rib disposed between the pair. The side bars 15 can extend along each side 14$s$ of the center ribs 14 substantially from the bottom 12$b$ of the first lower ribs 12 to a top 13$t$ of the first upper ribs 13. The side bars 15 can be substantially absorptive, substantially transmissive, or substantially reflective to incoming light. The side bars 15 can can comprise or can consist of a dielectric material, a metal, or other material. Whether the side bars 15 are substantially absorptive, substantially transmissive, or substantially reflective can depend on overall polarizer structure and intended use.

There can be a gap 16 between each side bar 15 and corresponding center rib 14 and an adjacent side bar 15 and corresponding center rib 14. The gaps 16 can allow each side bar 15 to act individually and thus to affect one light polarization (e.g. s-polarization) differently than another light polarization (e.g. p-polarization). Having solid-material-free gaps can improve transmission of p-polarized light (increase Tp) in some designs.

At least one of the first lower ribs 12, first upper ribs 13, and side bars 15 can be substantially reflective of incoming light. At least one of the first lower ribs 12, first upper ribs 13, and side bars 15 can be substantially absorptive to incoming light. At least one of the first lower ribs 12, first upper ribs 13, and side bars 15 can be substantially transmissive of incoming light.

Figure 2:
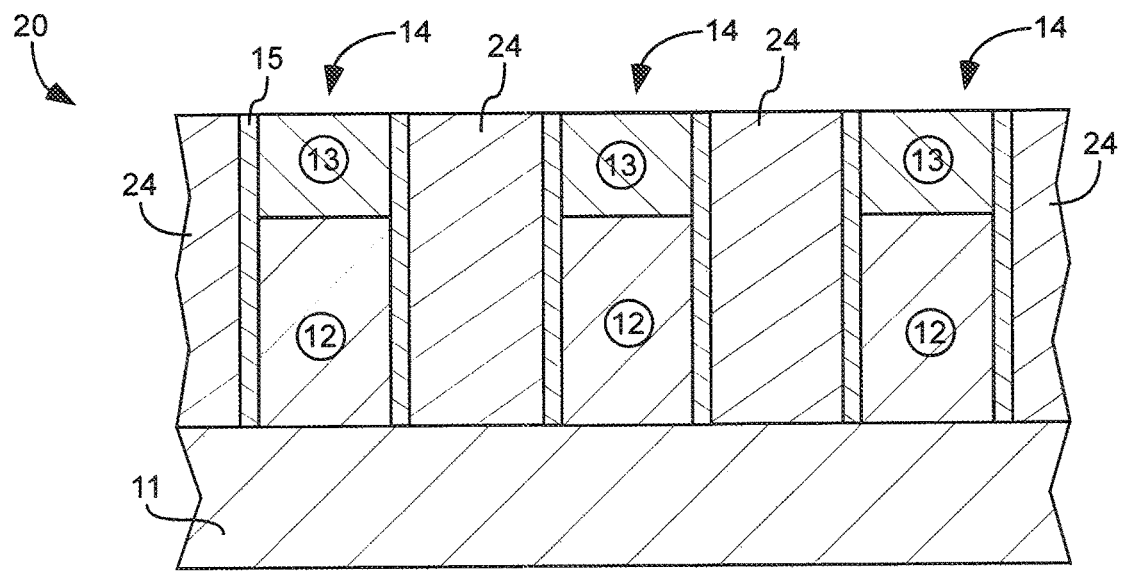
FIG. 2 is a schematic cross-sectional side view of a wire grid polarizer 20, similar to the wire grid polarizer 10 of FIG. 1, with side ribs 24 substantially filling gaps 16 between the combined center rib 14—side bar 15 structure, and also illustrating a step in the first method for making a wire grid polarizer, in accordance with embodiments of the present invention.

As shown on wire grid polarizer 20 in FIG. 2, side ribs 24 can be disposed in the gaps 16. The side ribs 24 can substantially fill the gaps 16. A side region can include the side ribs 24 and/or the side bars 15.

The side ribs 24 can be formed by spinning on a liquid that can harden upon evaporation of an included solvent. For example, spin-on a liquid glass in a solvent, then bake out the solvent. Another method is applying multiple layers by use of atomic layer deposition (ALD). Then, the material that was added, such as by ALD or spin on, can be etched down to form separate side ribs 24 in each gap 16.

At least one of the first lower ribs 12, first upper ribs 13, side bars 15, and side ribs 24 can be substantially reflective of incoming light. At least one of the first lower ribs 12, first upper ribs 13, side bars 15, and side ribs 24 can be substantially absorptive to incoming light. At least one of the first lower ribs 12, first upper ribs 13, side bars 15, and side ribs 24 can be substantially transmissive of incoming light.

Figure 3:
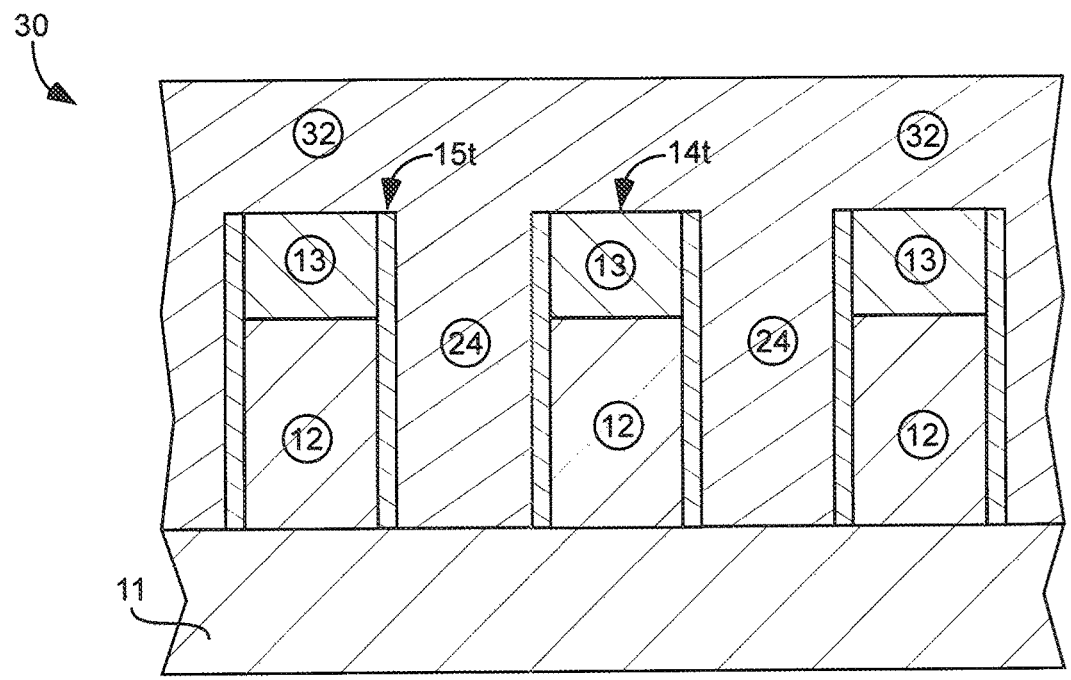
FIG. 3 is a schematic cross-sectional side view of a wire grid polarizer 30, similar to the wire grid polarizer 20 of FIG. 2, but also including dielectric material 32 extending from the gaps 16 above and over tops of the center ribs 14 and the side bars 15, and also illustrating a step in the first method for making a wire grid polarizer, in accordance with embodiments of the present invention.

As shown on wire grid polarizer 30 in FIG. 3, a dielectric material 32 can extend above and over tops 14$t$ of the center ribs 14 and over tops 15$t$ the side bars 15. The dielectric material 32 can be the same material as that of the side ribs 24 and thus can extend from the gaps 16 over tops 14$t$ of the center ribs 14 and over tops 15$t$ the side bars 15. The dielectric material 32 can be formed during the same manufacturing step as that of formation of the side ribs 24 or the dielectric material 32 can be added above the side ribs 24 after their formation, such as by chemical or physical vapor deposition. If dielectric material 32 is the same material as that of the side ribs 24, then this dielectric material 32 can be added, such as by spin-on or ALD for example, but not etched down to form separate side ribs 24.

Figure 4:
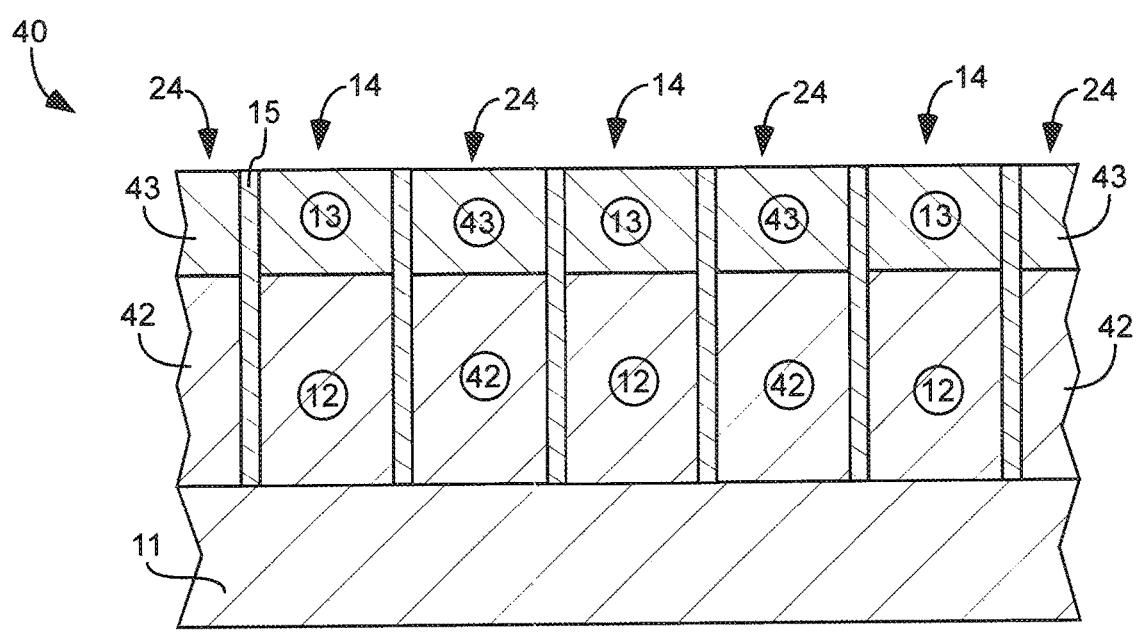
FIG. 4 is a schematic cross-sectional side view of a wire grid polarizer 40, similar to the wire grid polarizer 20 of FIG. 2, wherein the side ribs 24 comprise second lower ribs 42 and second upper ribs 43 and the side bars 15 separate the first lower ribs 12 from the second lower ribs 42 and the first upper ribs 13 from the second upper ribs 43, in accordance with an embodiment of the present invention.

As shown on wire grid polarizer 40 in FIG. 4, the side ribs 24 can comprise second upper ribs 43 disposed over the second lower ribs 42. The second lower ribs 42 can be disposed adjacent to the substrate 11. The side bars 15 can separate the first lower ribs 12 from the second lower ribs 42 and the first upper ribs 13 from the second upper ribs 43.

The second upper ribs 43 can be substantially absorptive, substantially reflective, or substantially transmissive to incoming light. The second upper ribs 43 can comprise or can consist of a dielectric material, a metal, or other material. Whether the second upper ribs 43 are substantially absorptive, substantially transmissive, or substantially reflective can depend on overall polarizer structure and intended use.

In one embodiment, one of the second lower ribs 42 or second upper ribs 43 can be substantially transmissive to incoming light and the other can be substantially absorptive of incoming light. In another embodiment, one of the second lower ribs 42 or second upper ribs 43 can be substantially reflective and the other can be substantially transmissive or substantially absorptive of incoming light.

First Method—Applicable to the First Structure Group (FIGS. 1-4):

The wire grid polarizers 10, 20, 30, and 40 shown in FIGS. 1-4 can be made by some or all of the following steps in this First Method:

1. Providing a substrate 11 (see FIG. 5):
   a. The substrate can be substantially transmissive to incoming light. In methods of making described herein, the term "substrate" can be a single material or can be multiple layers of materials, such as for example a glass wafer with at least one thin film on a surface of the wafer.
   b. The substrate can have a continuous thin film 53 of material over a surface of the substrate. The film may be applied by various methods including chemical vapor deposition or physical vapor deposition. The thin film 53 can be a dielectric material, a metal, or other material. The thin film 53 can be substantially transmissive, substantially reflective, or substantially absorptive of incoming light depending on desired use of the polarizer, other materials of polarizer construction, and overall polarizer design.
2. Etching the substrate 11 and the thin film 53 to form (see FIG. 6):
   a. an array of parallel, elongated center ribs 14 disposed over the substrate 11, the center ribs 14 comprising first upper ribs 13 disposed over first lower ribs 12; and
   b. solid-material-free gaps 16 between the ribs 14.

Figure 5:
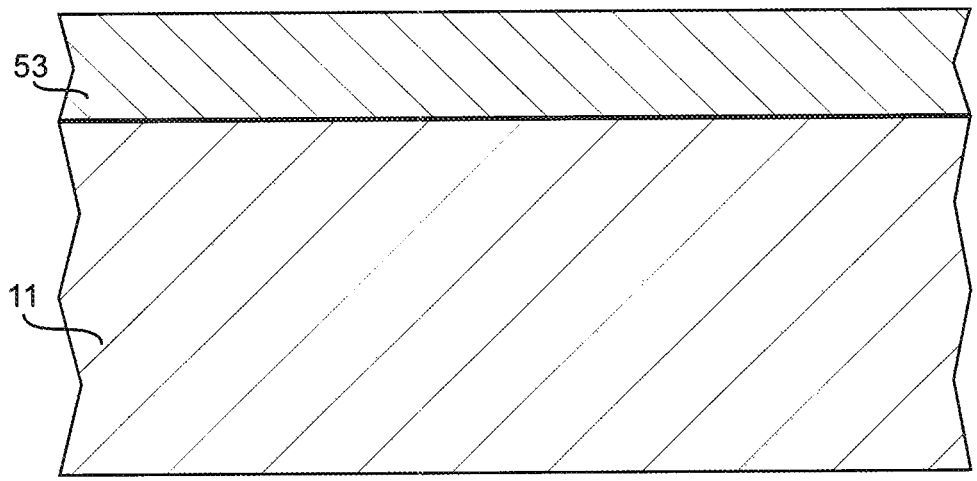
FIG. 5 is a schematic cross-sectional side view of a of step in a first method for making a wire grid polarizer—providing a substrate 11 that is substantially transmissive to incoming light and applying a continuous thin film of material 53 over a surface of the substrate 11—in accordance with an embodiment of the present invention.
Figure 6:
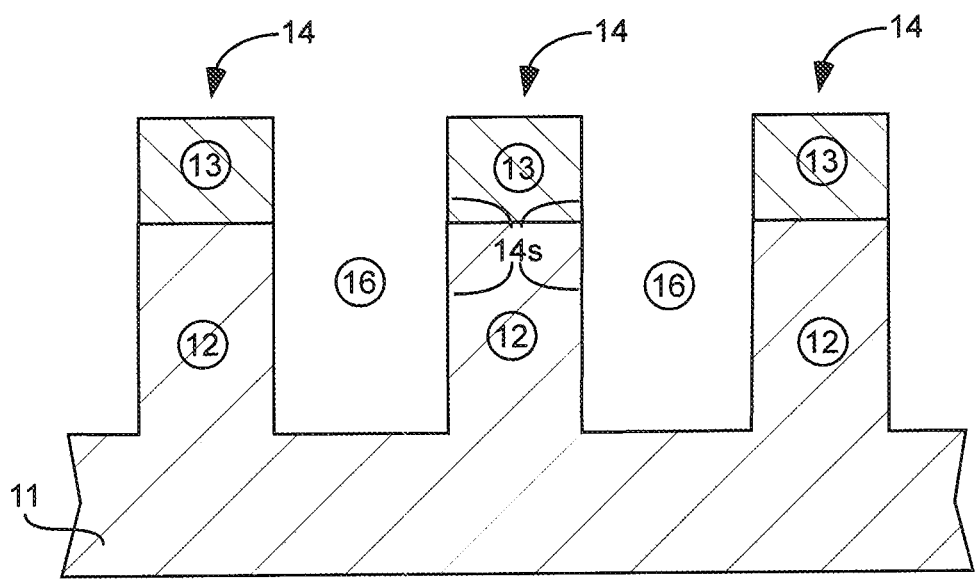
FIG. 6 is a schematic cross-sectional side view of a of step in the first method for making a wire grid polarizer—etching the substrate 11 and the thin film 53 to form (a) an array of parallel, elongated center ribs 14 disposed over the substrate 11 and (b) solid-material-free gaps 16 between the center ribs 14—in accordance with an embodiment of the present invention.

The first lower ribs 12 in FIG. 6 can be a different material than the substrate 11 in FIG. 6 if the original substrate shown in FIG. 5 was a substrate with a layer of material on top and the first lower ribs 12 were etched into this top layer. For example, if the substrate 11 originally was silicon dioxide with a layer of titanium dioxide, and the etch went through the titanium dioxide layer, then the remaining substrate 11 could be silicon dioxide and the first lower ribs 12 could be only titanium dioxide or an upper titanium dioxide region and a lower silicon dioxide region.

Figure 7:
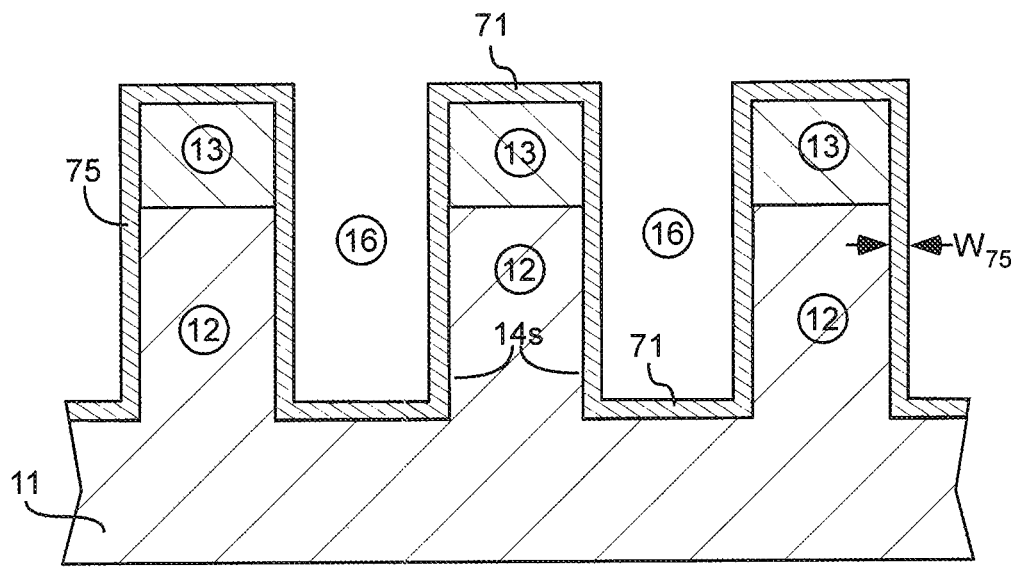
FIG. 7 is a schematic cross-sectional side view of step 3 of the first method for making a wire grid polarizer—conformal coating the substrate 11 and the center ribs 14 with a layer of material 75 while maintaining solid-material-free gaps 16 between the center ribs 14—in accordance with an embodiment of the present invention.

3. Conformal coating (e.g. atomic layer deposition) the substrate 11 and the center ribs 14 with a layer of material 75 while maintaining the solid-material-free gaps 16 between the ribs 14 (see FIG. 7). Note that "maintaining the solid-material-free gaps 16" means that there can remain a solid-material-free region between the first lower ribs 12, but of course the gaps 16 will be reduced in size by the added layer of material 75. The layer of material 75 can be the desired material of the final side bars 15 described in step 4.
4. Etching the layer of material 75 to remove horizontal segments 71 and leaving vertical side bars 15 along sides of the center ribs 14 (see FIGS. 7-8). The etch can be an anisotropic etch in order to remove horizontal segments 71 while leaving the vertical side bars 15.

The following steps 5-6 can be done for improved wire grid polarizer durability or to otherwise affect polarizer performance.

5. Backfilling the gaps 16 forming side ribs 24 (see FIG. 2).
   a. Backfilling can be done by spinning on a liquid that can harden upon evaporation of an included solvent. For example, spin on a liquid glass in a solvent, then bake out the solvent. Other backfilling methods may be used, such as for example applying multiple layers by use of atomic layer deposition (ALD).
   b. The structure of FIG. 2 may be formed by backfilling above the center ribs 14 and side bars 15 with desired material of the side ribs 24 then etching down to tops of the center ribs 14 and side bars 15, thus forming the separate side ribs 24.
6. Backfilling above the center ribs 14 and side bars 15 with dielectric material 32 (see FIG. 3).
   a. The dielectric material 32 can be the same material as, or different from, that of the side ribs 24.
   b. If the dielectric material 32 is the same material as that of the side ribs 24, then it can be applied in the same manufacturing step as filling the gaps 16. For example, a liquid material can both fill the gaps 16 and above the center ribs 14, then the liquid may be heated to cure and harden.
   c. If the dielectric material 32 is a different material than the side ribs 24, then chemical vapor deposition or physical vapor deposition can be used for applying this layer of dielectric material 32 above the center ribs 14 and the side ribs 24.
   d. If the dielectric material 32 will be part of the final polarizer, then it may be preferred to use a transmissive dielectric material because a continuous layer of absorptive dielectric material can undesirably increase absorption of p-polarized light.

In one aspect, the above steps can be performed in the order shown. All steps may not be required. For example, the process could end at the end of step 4 if side ribs 24 and dielectric material 32 are not desired.

Figure 9:
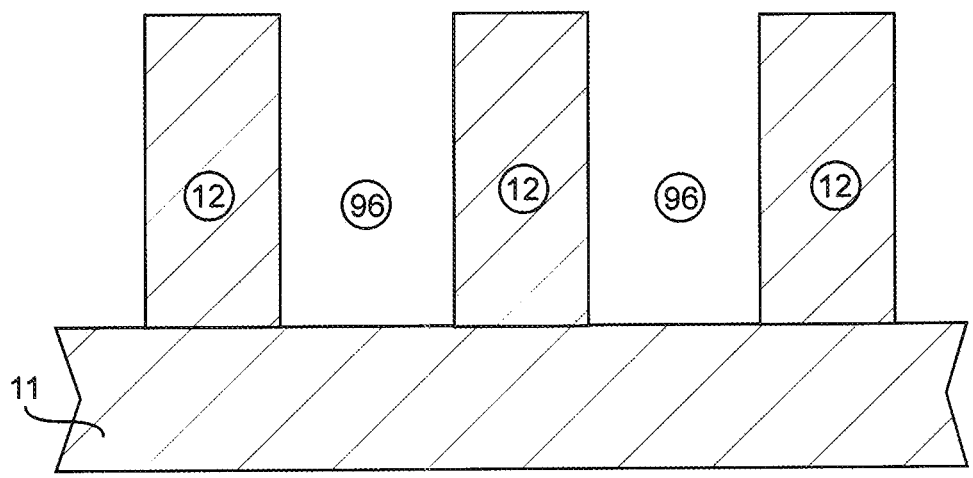
FIG. 9 is a schematic cross-sectional side view of a of step in a second method for making a wire grid polarizer—providing a substrate 11 having an array of parallel, elongated first lower ribs 12 disposed over the substrate 11—in accordance with an embodiment of the present invention.
Figure 10:
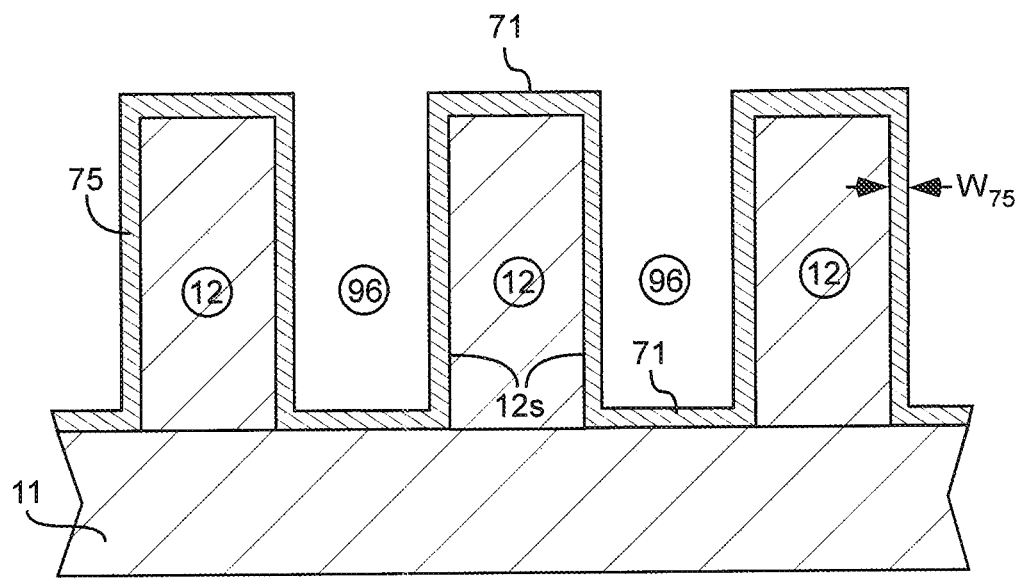
FIG. 10 is a schematic cross-sectional side view of a of step in the second method for making a wire grid polarizer—conformal coating the substrate 11 and the first lower ribs 12 with a layer of material 75 while maintaining solid-material-free first gaps 96 between the first lower ribs 12—in accordance with an embodiment of the present invention.
Figure 11:
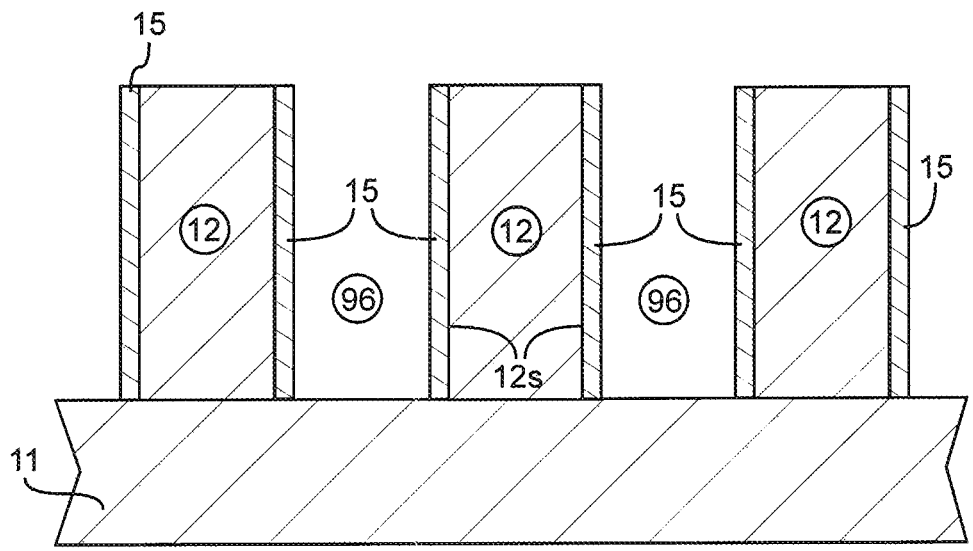
FIG. 11 is a schematic cross-sectional side view of a of step in the second method for making a wire grid polarizer—etching the layer of material 75 to remove horizontal segments 71 and leaving vertical side, bars 15 along sides 12s of the first lower ribs 12—in accordance with an embodiment of the present invention.

Second Method—Applicable to the First Structure Group (FIGS. 1-4):

The wire grid polarizers 10, 20, 30, and 40 shown in FIGS. 1-4 can be made by some or all of the following steps in this Second Method:

1. Providing a substrate 11 having an array of parallel, elongated first lower ribs 12 disposed over the substrate 11 (see FIG. 9). There can be solid-material-free first gaps 96 between the first lower ribs 12. The substrate 11 and first lower ribs 12 can have properties as described in other sections herein. The substrate 11 itself, or a layer of material on top of the substrate 11, can be patterned and etched to form the first lower ribs 12.
2. Conformal coating the substrate and the first lower ribs 12 with a layer of material 75 while maintaining the first gaps 96 between the first lower ribs 12 (see FIG. 10). Note that "maintaining the first gaps 96" means that there can remain a solid-material-free region between the first lower ribs 12, but of course the first gaps 96 will be reduced in size by the added layer of material 75. The layer of material 75 can be the desired material of the final side bars 15 described in step 3.
3. Etching the layer of material 75 to remove horizontal segments 71 and leaving vertical side bars 15 along sides of the first lower ribs 12 (see FIG. 11). The etch can be an anisotropic etch in order to remove horizontal segments 71 while leaving the vertical side bars 15.

At this point, the wire grid polarizer may be usable. The following steps can be added to create a selectively absorptive wire grid polarizer, to embed the polarizer, and/or to modify other characteristics of the polarizer.

Figure 12:
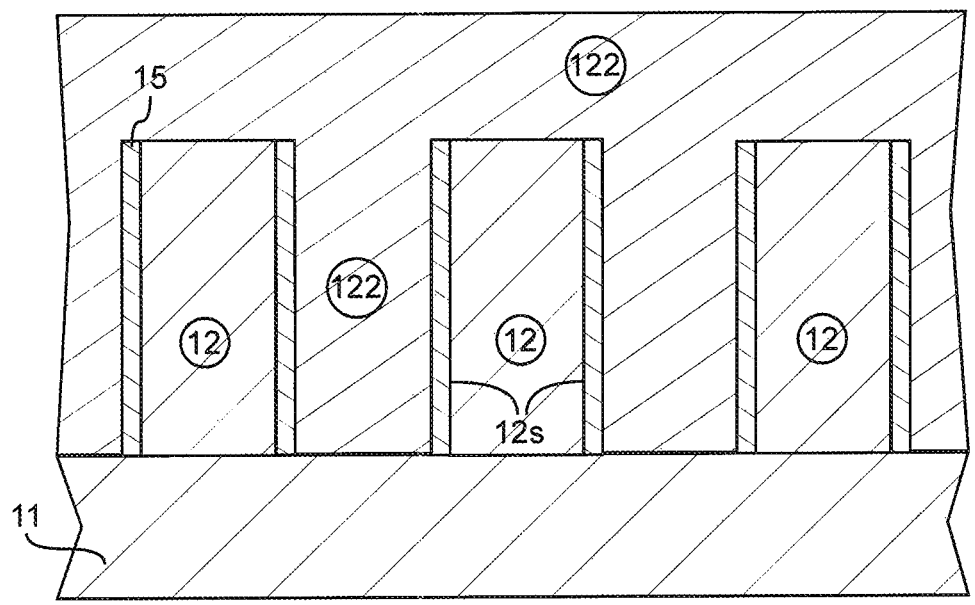
FIG. 12 is a schematic cross-sectional side view of a of step in the second method for making a wire grid polarizer—backfilling the first gaps 96 and continuing to fill above the first lower ribs 12 and the side bars 15 with fill material 122, the fill material 122 having similar etch properties with the first lower ribs 12—in accordance with an embodiment of the present invention.
Figure 13:
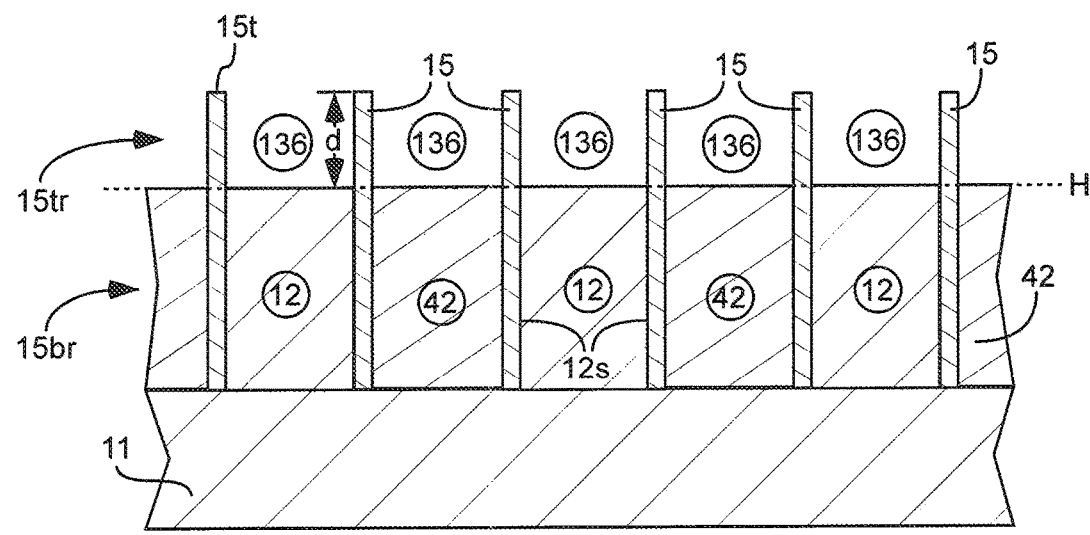
FIG. 13 is a schematic cross-sectional side view of a of step in the second method for making a wire grid polarizer—etching the fill material 122 and the first lower ribs 12 below a top 15t of the side bars 15 forming solid-material-free second gaps 136 at a top region 15tr of the side bars 15 and forming second lower ribs 42 between the side bars 15 on a same plane as the first lower ribs 12 (at a bottom region 15br of the side bars 15)—in accordance with an embodiment of the present invention.
Figure 14:
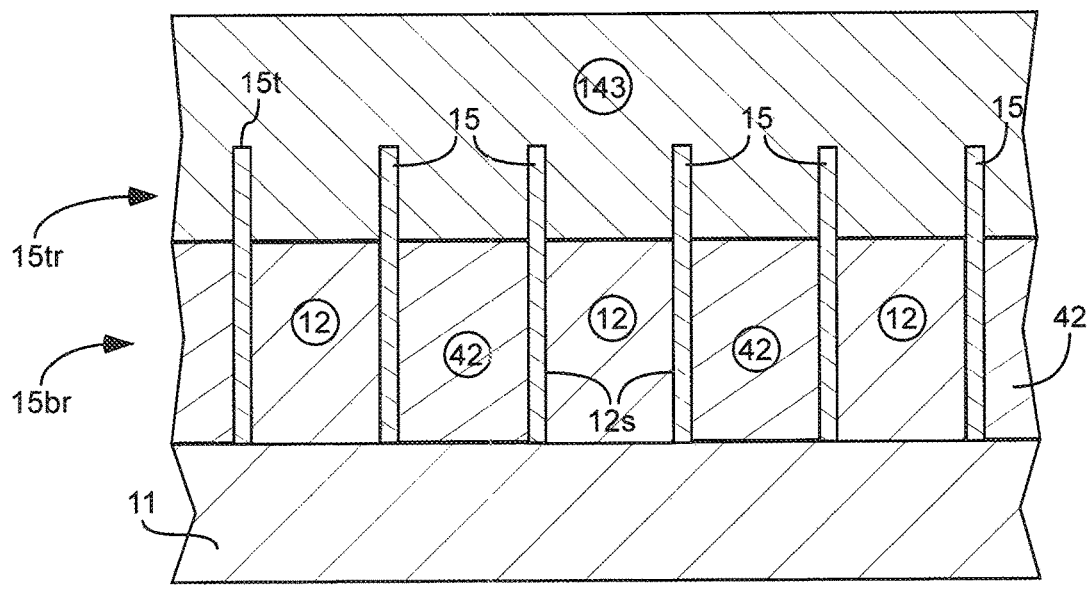
FIG. 14 is a schematic cross-sectional side view of a of step in the second method for making a wire grid polarizer—backfilling the second gaps 136 and continuing to fill above tops 15t of the side bars 15 with upper material 143—in accordance with an embodiment of the present invention.
Figure 15:
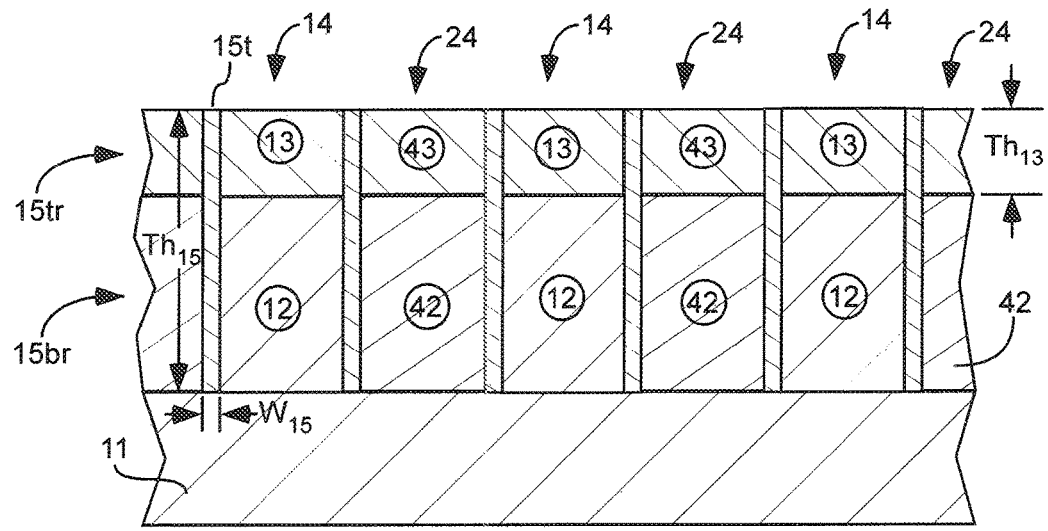
FIG. 15 is a schematic cross-sectional side view of a of step in the second method for making a wire grid polarizer—etching the upper material 143 at least down to tops 15t of the side bars 15 forming an array of parallel, elongated, upper ribs 13 and 43 above the lower ribs 12 and 42, with first upper ribs 13 over the first lower ribs 12 and second upper ribs 43 over the second lower ribs 42, and the side bars 15 separating the first lower ribs 12 from the second lower ribs 42 and the first upper ribs 13 from the second upper ribs 43—in accordance with an embodiment of the present invention.

4. Backfilling the first gaps 96 and continuing to fill above the first lower ribs 12 and the side bars 15 with fill material 122 (see FIG. 12). The fill material 122 can have similar etch properties with the first lower ribs 12. Backfilling with the fill material 122 can be done by spinning on a liquid that can harden upon evaporation of an included solvent. For example, spin on a liquid glass in a solvent, then bake out the solvent. Other backfilling methods may be used, such as for example applying multiple layers by use of atomic layer deposition (ALD).
5. Etching the fill material 122 and the first lower ribs 12 below a top 15t of the side bars 15 forming solid-material-free second gaps 136 at a top region 15tr of the side bars 15 and forming second lower ribs 42 between the side bars 15 and the first lower ribs 12 on a same plane as the first lower ribs 12 (at a bottom region 15br of the side bars 15) (see FIG. 13).
   a. An etch may be selected to preferentially etch the fill material 122 and the first lower ribs 12 with minimal etch of the side bars 15.
   b. The second lower ribs 42 can be formed in locations of the previous solid-material-free first gaps 96.
   c. The first lower ribs 12 and the second lower ribs 42 can be etched to approximately the same height H due to similar etch characteristics of the fill material 122 compared to the first lower ribs 12.
   d. The depth d of the etch below a top 15t of the side bars 15 can be approximately equivalent to a thickness $Th_{13}$ of upper ribs 13 and 43 described in the next steps. For example, the depth d of the etch below a top 15t of the side bars 15, a thickness $Th_{13}$ of the first upper ribs 13, and/or a thickness $Th_{13}$ of the second upper ribs 43 can be at least 5 nm in one aspect, at least 10 nm in another aspect, at least 25 nm in another aspect, or at least 75 nm in another aspect.
   e. The fill material 122 and the second lower ribs 42 can be a material that is substantially transmissive, substantially reflective, or substantially absorptive of incoming light.
6. Backfilling the second gaps 136 and continuing to fill above the tops 15t of the side bars 15 with upper material 143 (see FIG. 14). Backfilling can be done by a similar method as described in step 4 above.
7. Etching the upper material 143 at least down to the tops 15t of the side bars 15 forming an array of parallel, elongated, upper ribs 13 and 43 above the first lower ribs 12 and above the second lower ribs 42 (see FIG. 15). First upper ribs 13 can be disposed over the first lower ribs 12 and second upper ribs 43 over the second lower ribs 42. The side bars 15 can separate the first lower ribs 12 from the second lower ribs 42 and can separate the first upper ribs 13 from the second upper ribs 43.

In the second method, at least one of the first lower ribs 12, the second lower ribs 42, the first upper ribs 13, the second upper ribs 43, and the side bars 15 can be substantially transmissive, substantially absorptive, or substantially reflective of incoming light.

In one aspect, the above steps can be performed in the order shown. All steps may not be required. For example, the process could end at the end of step 6 if the upper material 143 need not be separated into first upper ribs 13 and second upper ribs 43.

Comparison of the First and Second Methods:

The choice of method 1 or method 2 can depend on the desired final structure, available manufacturing tools, complexity of manufacturing, and manufacturing cost.

Figure 8:
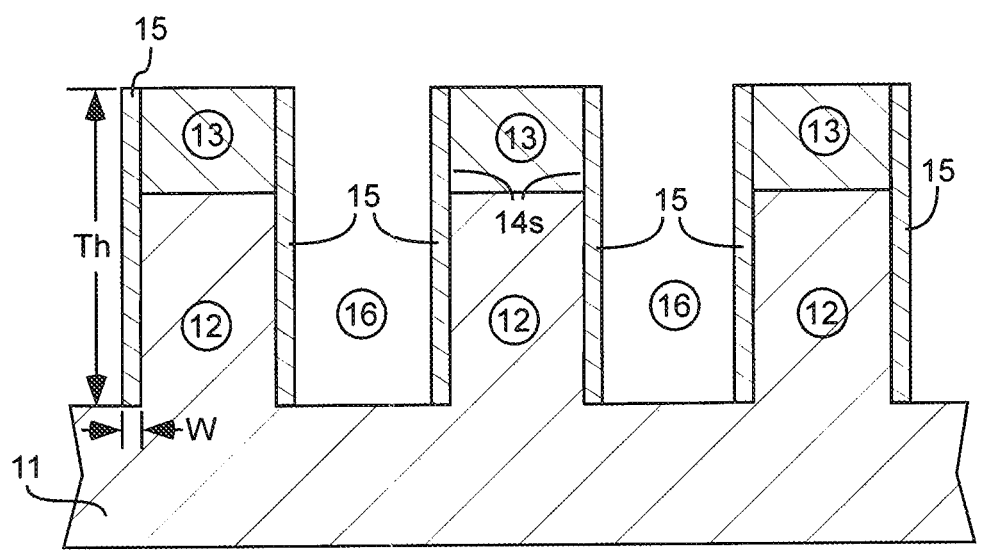
FIG. 8 is a schematic cross-sectional side view of a of step in the first method for making a wire grid polarizer—etching the layer of material 75 to remove horizontal segments 71 and leaving vertical side bars 15 along sides 14s of the center ribs 14—in accordance with an embodiment of the present invention.

Method 1 can provide a partially embedded wire grid polarizer, as shown in FIG. 8, without any backfilling step. Backfilling under method 1 may only be needed for fully embedding this structure. Method 1 can result in a structure with upper ribs that are alternating transmissive and absorptive in an upper region 15tr of the side bars 15 (as shown in FIG. 2 if one of side ribs 24 or first upper ribs 13 are transmissive and the other is absorptive).

Two backfilling steps can be used in Method 2. Method 2 can result in a structure with upper ribs 13 and 43 that both are made of a single material in an upper region 15tr of the side bars 15.

Figure 16:
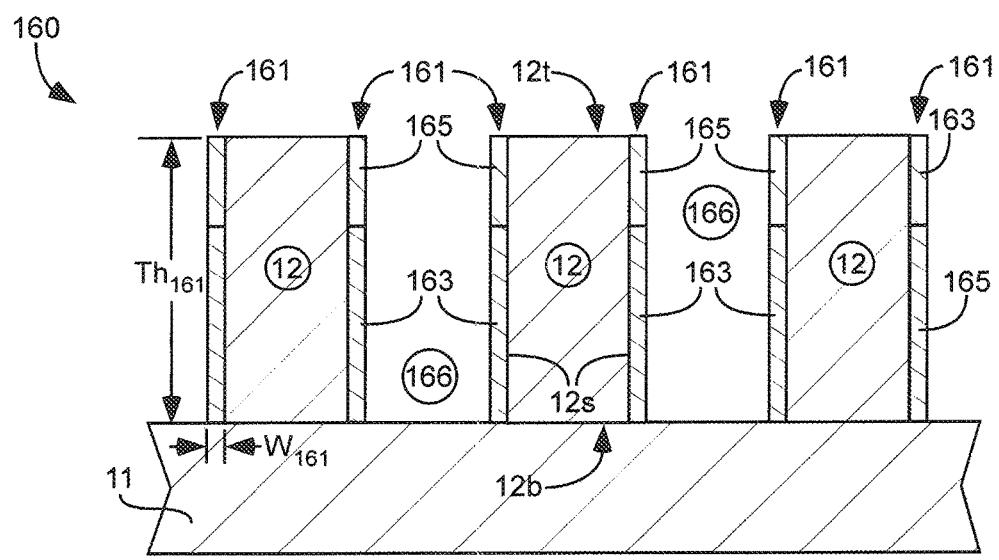
FIG. 16 is a schematic cross-sectional side view of a wire grid polarizer 160 including elongated strips 161 disposed along each side 12s of first lower ribs 12, the strips 161 comprising lower wires 163 and upper wires 165, in accordance with an embodiment of the present invention.

Second Structure Group (FIGS. 16-18):

As illustrated in FIG. 16, a wire grid polarizer 160 is shown comprising an array of parallel, elongated first lower ribs 12 disposed over a substrate 11. The first lower ribs 12 can have a bottom 12b attached to the substrate 12, a top surface 12t opposite the bottom 12b, and two opposite sides 12s. The first lower ribs 12 can be integral, with, and can be formed of the same material as, the substrate 11. Alternatively, the first lower ribs 12 can be formed of a different material than the substrate 11. The substrate 11 can be substantially transmissive to incoming light.

An elongated strip 161 can be disposed along each side 12s of the first lower ribs 12. Thus, a pair of strips 161 can sandwich and can adjoin a first lower rib 12 disposed between the pair. There can be a gap 166 between each strip 161 and corresponding first lower rib 12 and an adjacent strip 161 and corresponding first lower rib 12. The strips 161 can comprise lower wires 163 and upper wires 165.

Figure 17:
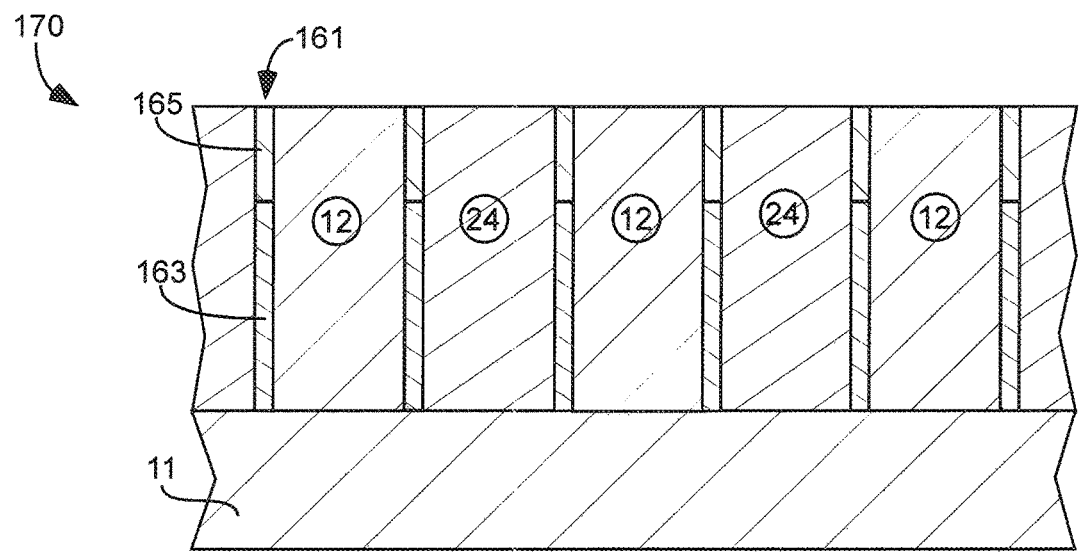
FIG. 17 is a schematic cross-sectional side view of a wire grid polarizer 170, similar to wire grid polarizer 160 of FIG. 16, with side ribs 24 substantially filling gaps 166 between the first lower rib 12—strip 161 structures, in accordance with an embodiment of the present invention.

As shown on wire grid polarizer 170 of FIG. 17, side ribs 24 can substantially fill the gaps 16. As shown on wire grid polarizer 180 of FIG. 18, dielectric material 32, which can be the same material as the side ribs 24, can extend from the gaps 166 above and over tops 12t of the first lower ribs 12 and over tops 161t of the strips 161. Alternatively, the dielectric material 32 can be a different material than the side ribs 24 and can be deposited above the side ribs 24, first lower ribs 12, and strips 161. The dielectric material 32 can have properties as described above in reference to FIGS. 2 and 3.

At least one of the upper wires 165, the lower wires 163, the side ribs 24, the first lower ribs 12, and the dielectric material 32 can comprise or can consist of a material that is substantially absorptive, substantially reflective, or substantially transmissive of incoming light. For example, in one embodiment of a polarizer for visible light, the lower wires 163 could be aluminum for polarization of incoming light, the upper wires 165 could be silicon for absorption of incoming light, and the first lower ribs 12 and the side ribs 24 could be silicon dioxide and be substantially transmissive of incoming light.

The first lower ribs 12 can define a central region. The strips 161 and/or the side ribs 24 can define side regions.

Figure 18:
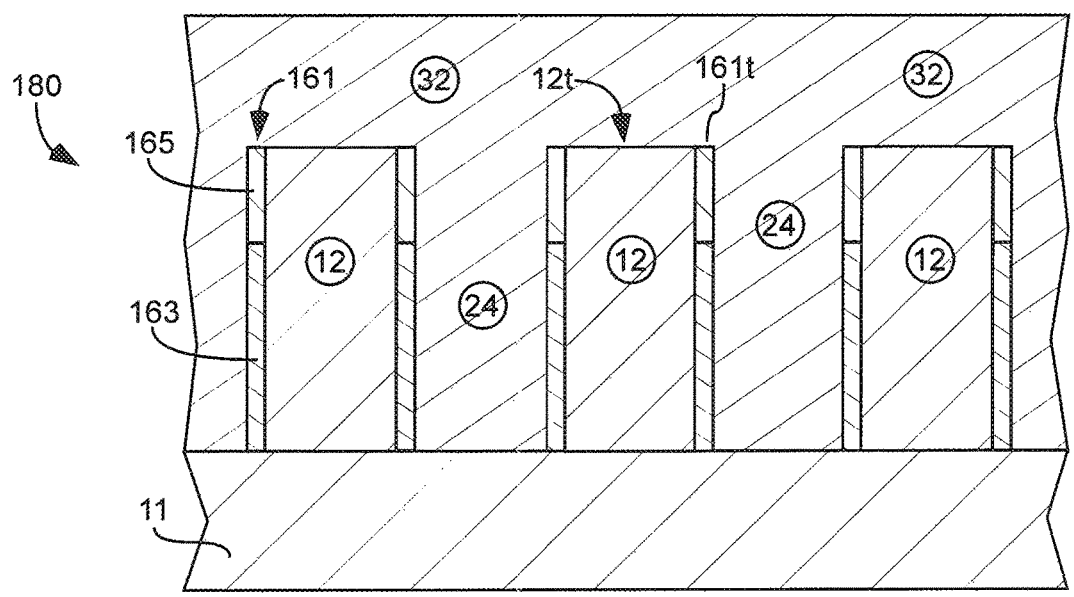
FIG. 18 is a schematic cross-sectional side view of a wire grid polarizer 180, similar to wire grid polarizer 170 of FIG. 17, but also including dielectric material 32 extending from the gaps 16 above and over tops 12t of the first lower ribs 12 and the strips 161, in accordance with an embodiment of the present invention.

Comparison of the First Structure Group (FIGS. 1-4) to the Second Structure Group (FIGS. 16-18):

Selection of the wire grid polarizers shown in FIG. 1-4 or the wire grid polarizers shown in FIGS. 16-18 can be made based on desired width or thickness of different regions (side bar 15 or strip 161 thickness), and manufacturability considerations. Note that the side bars 15 in FIGS. 1-4 are taller than the first lower ribs 12 in FIGS. 1-4. In comparison, the strips 161 in FIGS. 16-18 can be about the same height as the first lower ribs 12 in FIGS. 16-18, and thus the upper wires 165 and the lower wires 163 can each be shorter than the first lower ribs 12. Different applications may find one or the other of these designs to be optimal. Each design has different manufacture requirements, and thus one design may be preferable over another due to manufacturability considerations.

Third Method—Applicable to the Second Structure Group (FIGS. 16-18):

The wire grid polarizers 160, 170, and 180 shown in FIGS. 16-18 can be made by some or all of the following steps:

1. Providing a substrate 11 having an array of parallel, elongated first lower ribs 12 disposed over the substrate 11. See FIG. 9.
2. Conformal coating (such as with atomic layer deposition for example) the substrate 11 and the first lower ribs 12 with a first material while maintaining the solid-material-free first gaps 96 between the first lower ribs 12. This step is similar to the manufacturing step shown in FIG. 10.
3. Etching the first material to remove horizontal segments and leaving lower wires 163 along sides of the center ribs 14. Continuing to etch the lower wires 163 below tops 12t of the first lower ribs 12.
4. Applying a resist. Patterning to provide openings above the lower wires 163.
5. Applying a second material.
6. Etching the second material to remove horizontal segments and leaving the upper wires 165 along sides of the first lower ribs 12 and above the lower wires 163.
7. Removing the resist.

The above seven steps can be used to make the wire grid polarizer shown in FIG. 16. The side ribs 24 and the dielectric material 32 may be applied as described above under the First Method section to make one of the polarizers 170 or 180 shown in FIGS. 17-18.

Figure 19:
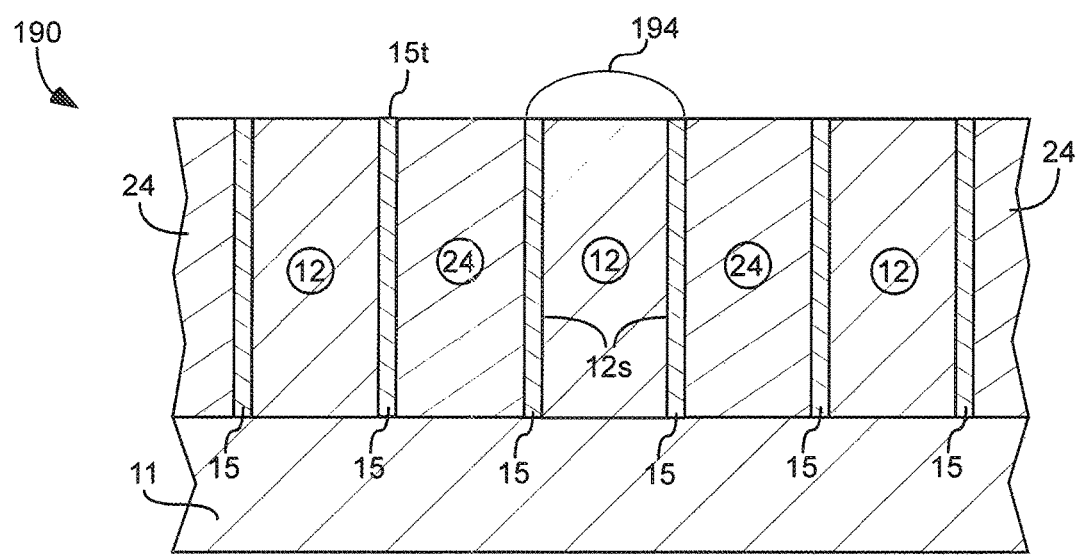
FIG. 19 is a schematic cross-sectional side view of a wire grid polarizer 190 including side-by-side first lower ribs 12, side bars 15, and side ribs 24 with a side bar 15 between each first lower rib 12 and each side rib 24, in accordance with an embodiment of the present invention.

Third Structure (FIG. 19):

As shown in FIG. 19, a wire grid polarizer 190 can include side-by-side first lower ribs 12, side bars 15, and side ribs 24, with a side bar 15 between each first lower rib 12 and side rib 24, and all disposed over a substrate 11 that is substantially transmissive to incoming light. In other words, an array of parallel, elongated first lower ribs 12 can be disposed over the substrate 11. The first lower ribs 12 can have two opposite sides 12s. An array of elongated side bars 15 can be disposed over the substrate 11 and can include a side bar 15 disposed along and adjoined to each side 12s of each of the first, lower ribs 12. Each first lower rib 12 and accompanying pair of side bars 15 can define or can be called a central group 194. An array of elongated side ribs 24 can be disposed over the substrate 11 with a side rib 24 disposed between and adjoined to adjacent central groups 194.

At least one of the first lower ribs 12, side bars 15, and side ribs 24 can be substantially reflective, substantially absorptive, or substantially transmissive to incoming light.

Wire grid polarizer 190 can be made by steps 1-4 of the Second Method described above, then etching the fill material 122 down to tops 15t of the side bars 15 such that the side bars 15 separate first lower ribs 12 from adjacent side ribs 24.

An advantage of this wire grid polarizer 190 may be a simplified manufacturing process compared to some of the other designs described previously. A disadvantage may be fewer regions. In some designs, the additional regions may be important for wire grid polarizer function.

General Information for all Embodiments and Methods:

U.S. patent application Ser. No. 13/326,566, filed on Dec. 15, 2011, and U.S. Pat. No. 7,570,424 and U.S. Pat. No. 7,961,393, incorporated herein by reference in their entirety, provide examples of possible substrate materials, dielectric materials including absorptive dielectric materials and transmissive dielectric materials, and reflective materials. The reflective materials can also be made of a semiconductor material doped to achieve a desired level of conductivity, other types of conductors such as certain forms of carbon, or other suitable materials.

The meaning of a material being substantially absorptive, substantially reflective, or substantially transmissive of incoming light means that the material can absorb, reflect, or transmit respectively specified, desired wavelengths, or a desired wavelength range. A material can be absorptive of one wavelength range and transmissive of another wavelength range. The actual absorption, reflection, or transmission can be dependent on ionic, crystalline, and stoichiometric state of the material as well as on the overall wire grid polarizer structure.

Modeling has shown that the wire grid polarizer designs described herein can have relatively high transmission of p-polarized light and high contrast, and also can have high absorption or reflection of s-polarized light. Disposing side bars 15 or strips 161 on both sides 12s of the first lower ribs 12, can provide relatively small pitch, even with limitations of present manufacturing technology. The wire grid polarizer designs described herein also can have an advantage of at least partially embedding the side bars 15 or strips 161 (e.g. wire grid polarizers 10 and 160) or substantially or fully embedding the side bars 15 or strips 161 (e.g. wire grid polarizers 20, 30, 40, 170, 180, and 190).

Partially embedding the side bars 15 or strips 161 means that the side bars 15 or strips 161 are supported on one side, such as by the center rib 14 or first lower rib 12, but not on both sides. Thus, in a partially embedded structure, one side of the side bar 15 or strip 161 can be attached to and can be supported by the center rib 14 or first lower rib 12 and the other side can face air and not be supported. Embedding the side bars 15 and strips 161, whether fully or partially, can increase wire grid polarizer durability. The choice of a fully or partially embedded wire grid polarizer can depend on overall performance requirements of the polarizer, polarizer durability requirements (including both chemical resistance and resistance to damage by handling), and materials used.

Although embedding reflective wires of a wire grid polarizer can increase wire grid polarizer durability, embedding the reflective wires can also adversely affect wire grid polarizer performance, especially by decreasing, transmission of p-polarized light (decrease Tp). Therefore, embedded wire grid polarizers have often not been implemented in practice for applications requiring high polarizer performance, such as for example in computer projectors or semiconductor analysis equipment. Modeling has shown that the specific designs described herein, although partially or completely embedded, especially combined with proper selection of side bar 15 or strip 161 aspect ratio, can provide good wire grid polarizer performance in spite of embedded, protected side bars 15 or strips 161.

For example, some embodiments of the polarizers described herein can transmit at least 90% of p-polarized light, or transmit at least 95% of p-polarized light; and can absorb at least 90% of s-polarized light, or can absorb at least 95% of s-polarized light at a selected wavelength of light (if there is at least one region with light absorbing properties). As another example, some embodiments of the polarizers described herein can transmit at least 85% of p-polarized light, or transmit at least 90% of p-polarized light; and can absorb at least 80% of s-polarized light, or can absorb at least 85% of s-polarized light at all light wavelengths from 400 nm through 700 nm (if there is at least one region with light absorbing properties).

The wire grid polarizers described herein can be made with a relatively high side bar 15 or strip 161 aspect ratio ($Th_{15}/W_{15}$ or $Th_{161}/W_{161}$). This can be done by formation of relatively tall center ribs 14 or first lower ribs 12 in relation to a width $W_{75}$ of the conformal layer of material 75 (which may approximate eventual side bar width $W_{15}$ or strip width $W_{161}$). Modeling has shown good polarization characteristics with side bar 15 or strip 161 aspect ratios of between 8 or 60. Modeling has shown good polarization characteristics in the visible spectrum with side bars 15 or strips 161 that have a width $W_{15}$ or $W_{161}$ respectively of between 5 nm and 20 nm and a thickness. This of between 150 nm and 300 nm.

What is claimed is:

1. A wire grid polarizer comprising:
   a) a substrate being substantially transmissive to incoming light;
   b) an array of parallel, elongated first lower ribs disposed over the substrate, the first lower ribs having a bottom attached to the substrate, a top surface opposite the bottom, and two opposite sides;
   c) an array of parallel, elongated, first upper ribs disposed over the top surface of the first lower ribs such that each first lower rib is paired with a corresponding first upper rib to define an array of center ribs;
   d) an array of elongated side bars including a side bar disposed along each side of each of the center ribs;
   e) a gap between each side bar and corresponding center rib and an adjacent side bar and corresponding center rib;
   f) at least one of the first lower ribs and first upper ribs is substantially reflective of the incoming light;
   g) the side bars are substantially absorptive of the incoming light; and
   h) the side bars extend along each side of the center ribs substantially from the bottom of the first lower ribs to a top of the first upper ribs.

2. The polarizer of claim 1, wherein material of the side bars absorbs greater than 40% of ultraviolet light.

3. The polarizer of claim 1, further comprising side ribs substantially filling the gaps.

4. The polarizer of claim 3, wherein the side ribs comprise a dielectric material and the dielectric material extends from the gaps above and over tops of the center ribs and the side bars.

5. The polarizer of claim 1, wherein the polarizer transmits 90% of one polarization of light and absorbs 80% of an opposite polarization of light at light wavelengths from 400 nm through 700 nm.

6. The polarizer of claim 1, wherein the side bars have a width of between 5 nm and 20 nm and a thickness of between 150 nm and 300 nm.

7. The polarizer of claim 1, wherein each side bar directly adjoins and contacts the first lower rib.

8. The polarizer of claim 1, wherein each side bar is physically separated from the adjacent side bars by the intervening center rib or by the gap such that each side bar does not contact adjacent side bars.

9. A wire grid polarizer comprising:
   a) a substrate being substantially transmissive to incoming light;
   b) an array of parallel, elongated first lower ribs disposed over the substrate, the first lower ribs having a bottom attached to the substrate, a top surface opposite the bottom, and two opposite sides;
   c) an array of parallel, elongated, first upper ribs disposed over the top surface of the first lower ribs such that each first lower rib is paired with a corresponding first upper rib to define an array of center ribs;
   d) an array of elongated side bars including a side bar disposed along each side of each of the center ribs;
   e) a gap between each side bar and corresponding center rib and an adjacent side bar and corresponding center ribs;
   f) at least one of the first lower ribs and first upper ribs is substantially reflective of the incoming light;
   g) the side bars are substantially absorptive of the incoming light; and
   h) an aspect ratio of the side bars is between 8 and 60.

10. The polarizer of claim 9, wherein each side bar directly adjoins and contacts the first lower rib.

11. The polarizer of claim 9, wherein each side bar is physically separated from the adjacent side bars by the intervening center rib or by the gap such that each side bar does not contact adjacent side bars.

12. A wire grid polarizer comprising:
    a) a substrate being substantially transmissive to incoming light;
    b) an array of parallel, elongated first lower ribs disposed over the substrate, the first lower ribs having two opposite sides;
    c) an array of elongated side bars disposed over the substrate including a side bar disposed along and adjoining each side of the first lower ribs;
    d) each first lower rib and pair of side bars defining a central group;
    e) an array of elongated side ribs disposed over the substrate including a side rib disposed between and adjoining adjacent central groups;
    f) at least one of the first lower ribs, side bars, and side ribs is substantially reflective of the incoming light;
    g) at least one other of the first lower ribs, side bars, and side ribs is substantially absorptive of the incoming light; and
    h) the side bars have a width of between 5 nm and 20 nm and a thickness of between 150 nm and 300 nm.

13. The polarizer of claim 12, wherein an aspect ratio of the side bars is between 8 and 60.

14. A first method of making a wire grid polarizer, the method comprising the following steps in order:
    a) providing a substrate that is substantially transmissive to incoming light and having a continuous thin film of material over a surface of the substrate;
    b) etching the substrate and the thin film of material to form an array of parallel, elongated center ribs disposed over the substrate, the center ribs comprising first upper ribs disposed over first lower ribs and solid-material-free gaps between the ribs;
    c) conformal coating the substrate and the center ribs with a layer of material while maintaining the solid-material-free gaps between the ribs; and
    d) etching the layer of material to remove horizontal segments and leaving vertical side bars along sides of the center ribs wherein at least one of the first lower ribs, the first upper ribs, and the side bars is substantially reflective of the incoming light.

15. The first method of claim 14, further comprising the following step after the step of etching the layer of material: backfilling the gaps with dielectric material, forming side ribs in the gaps.

16. The first method of claim 15, wherein backfilling the gaps with dielectric material further includes backfilling above the center ribs and side bars with the dielectric material, and wherein the dielectric material is substantially transmissive of the incoming light.

17. The first method of claim 14, wherein at least one of the first lower ribs, the first upper ribs, and the vertical side bars is substantially absorptive of incoming light.

18. The first method of claim 14, wherein the vertical side bars are substantially absorptive of the incoming light.

19. The polarizer of claim 14, wherein an aspect ratio of the side bars is between 8 and 60.

20. The polarizer of claim 14, wherein the side bars have a width of between 5 nm and 20 nm and a thickness of between 150 nm and 300 nm.

* * * * *